(12) United States Patent
Zell

(10) Patent No.: US 12,226,865 B2
(45) Date of Patent: Feb. 18, 2025

(54) DEVICE FOR SWIVELLING, TURNING AND CHANGING WORKPIECE PALLETS, AS WELL AS A HORIZONTAL MACHINING CENTER

(71) Applicant: BAVIUS TECHNOLOGIE GMBH, Baienfurt (DE)

(72) Inventor: Werner Zell, Eberhardzell (DE)

(73) Assignee: BAVIUS TECHNOLOGIE GMBH, Baienfurt (DE)

( * ) Notice: Subject to any disclaimer, the term of this patent is extended or adjusted under 35 U.S.C. 154(b) by 546 days.

(21) Appl. No.: 17/753,590

(22) PCT Filed: Aug. 10, 2020

(86) PCT No.: PCT/EP2020/072337
§ 371 (c)(1),
(2) Date: Mar. 8, 2022

(87) PCT Pub. No.: WO2021/047836
PCT Pub. Date: Mar. 18, 2021

(65) Prior Publication Data
US 2022/0324072 A1    Oct. 13, 2022

(30) Foreign Application Priority Data
Sep. 11, 2019    (DE) .................. 10 2019 213 870.5

(51) Int. Cl.
*B23Q 7/14*    (2006.01)
*B23Q 1/66*    (2006.01)
*B23C 1/02*    (2006.01)

(52) U.S. Cl.
CPC ............ *B23Q 1/66* (2013.01); *B23Q 7/1431* (2013.01); *B23C 1/02* (2013.01); *Y10T 29/5196* (2015.01); *Y10T 409/306048* (2015.01)

(58) Field of Classification Search
CPC ......... Y10T 29/5196; Y10T 409/30532; Y10T 409/305432; Y10T 409/306048–306104;
(Continued)

(56) References Cited

U.S. PATENT DOCUMENTS 4,679,286 A * 7/1987 Momoi ................ B23Q 7/1431
29/33 P
5,564,483 A * 10/1996 Sacchi ..................... B23Q 1/66
29/33 P
(Continued)

FOREIGN PATENT DOCUMENTS

CN    109261832 A    1/2019
DE    2713706 A1    10/1977
(Continued)

OTHER PUBLICATIONS

Screen shots from YouTube video titled "Handtmann HBZ Aerocell", which video was posted on Mar. 28, 2017, link https://www.youtube.com/watch?v=1sqqy6rGs_o.*
(Continued)

*Primary Examiner* — Erica E Cadugan
(74) *Attorney, Agent, or Firm* — McCoy Russell LLP

(57) ABSTRACT

In a device for manipulating workpiece pallets, with two parallel pivot arms, each of which can each be fitted with a pallet carrier, each of which is swivelled by a motor and a swivel gear about a substantially horizontal swivel axis, with each pallet carrier on the swivel arm being able to be turned parallel to the other pallet carrier by a motor and a gear about a swivel axis in parallel to the turning axis. In said device, the motors are electric motors, the gear is a combined beveled planetary gear and the swivel arms via a line shaft are mutually coupled for torsional strength.

13 Claims, 2 Drawing Sheets

(58) Field of Classification Search
CPC ........ Y10T 483/16–165; B23Q 7/1431; B23Q 7/1426–7/1494; B23Q 1/66; B23C 1/02–04; B21D 43/145
USPC .................. 29/33 P; 409/159, 161, 172–173; 198/345.3, 346.1; 483/14–15; 414/733, 414/742
See application file for complete search history.

(56) References Cited

U.S. PATENT DOCUMENTS

| | | | | |
|---|---|---|---|---|
| 6,216,325 | B1* | 4/2001 | Haninger | B23Q 7/1426 29/33 P |
| 6,264,418 | B1* | 7/2001 | Michael | B23Q 1/66 414/733 |
| 6,786,686 | B1* | 9/2004 | Koike | B23Q 7/1431 29/33 P |
| 12,070,828 | B2 | 8/2024 | Zell | B23Q 7/1431 |
| 2006/0130311 | A1* | 6/2006 | Kikuchi | B23Q 7/1431 29/563 |
| 2006/0260907 | A1* | 11/2006 | Ota | B23Q 1/66 198/346.1 |
| 2015/0165576 | A1* | 6/2015 | Prust | B23Q 7/1431 269/58 |
| 2017/0297157 | A1* | 10/2017 | Podiebrad | B23Q 7/1431 |
| 2022/0331918 | A1* | 10/2022 | Bader | B23Q 7/1431 |

FOREIGN PATENT DOCUMENTS

| | | |
|---|---|---|
| DE | 102004036371 A1 | 2/2006 |
| DE | 202015106048 U1 * | 1/2016 |
| DE | 102017217878 A1 | 4/2019 |
| EP | 0913227 A2 | 5/1999 |
| FR | 2972951 A1 * | 9/2012 |
| JP | 07-060589 A * | 3/1995 |
| JP | 11-114783 A * | 4/1999 |
| JP | 2006021262 A | 1/2006 |
| RU | 2257287 C1 | 7/2005 |
| SU | 794927 A1 | 5/1983 |
| WO | 2014058397 A1 | 4/2014 |
| WO | WO-2023/237285 A1 * | 12/2023 |

OTHER PUBLICATIONS

Article "Aluminum Machining In New Dimensions, MAPAL High-Volume Milling Cutters In Use at Bavius", from https://mapal.com/en-us/a/bavius-1; date "Apr. 12, 2023".*

Machine Translation of JP 11-114783 A, which JP '783 was published Apr. 1999.*

Machine Translation of DE 202015106048 U1, which DE '048 was published Jan. 2016.*

ISA European Patent Office, International Search Report Issued in Application No. PCT/EP2020/072337, Nov. 13, 2020, WIPO, 5 pages.

* cited by examiner

DEVICE FOR SWIVELLING, TURNING AND CHANGING WORKPIECE PALLETS, AS WELL AS A HORIZONTAL MACHINING CENTER

CROSS REFERENCE TO RELATED APPLICATIONS

The present application is a U.S. National Phase of International Application No. PCT/EP2020/072337 entitled "DEVICE FOR PIVOTING, TURNING AND EXCHANGING WORKPIECE PALLETS, AND HORIZONTAL MACHINING CENTER," and filed on Aug. 10, 2020. International Application No. PCT/EP2020/072337 claims priority to German Patent Application No. 10 2019 213 870.5 filed on Sep. 11, 2019. The entire contents of each of the above-listed applications are hereby incorporated by reference for all purposes.

TECHNICAL FIELD

The disclosure relates to a device as well as to a horizontal machining center.

BACKGROUND AND SUMMARY

Such devices referred to as pallet changing automation are well-known and used on horizontal machining centers [www.bavius-technologie.com "5-axis machining centers for high performance machining", type HBZ AeroCell; technical informational publication of 11/2018], for example for airplane parts in order to manipulate and change machined workpieces or workpiece pallets carrying blanks. The swivel arms are synchronously swivelled via motors and gears between a position parallel to the ground and an almost vertical position with one or two pallets docked back-to-back on the pallet carriers. When swivelling, the pallets or a single pallet are turned around the turning axis by motors and gears arranged on the swivel arms in order to be brought into the horizontal machining center in the correct position and placed on a shelf on the floor and changed by docking or undocking to or from the pallet carriers. Hydraulic motors or electric motors can be used as motors. The gears usually include planetary gears. Since the swivel arms as such can be swivelled separately and are swivelled synchronously via the control of the motors, with the control determining the respective positions of the swivel arms and the pallet carriers using complex sensors and measuring devices, a fault in the drive of a swivel arm, for example, can lead to critical safety situations when handling the pallet or pallets.

The object of the disclosure is to improve a device of the aforementioned type and a horizontal machining center in such a way that critical operating situations are ruled out in the event of a fault on one side.

Since the two swivel arms are coupled to one another in a rotationally fixed manner, the drive of the other swivel arm takes over the task on the faulty side in the event of a one-sided malfunction of the drive function, to the effect that the swivel arms are kept parallel despite the one-sided malfunction. Electric motors and combined swivel bevel and planetary gears are ideal prerequisites for carrying the additional load on the affected side without any problems, swivelling both swivel arms in parallel and holding them in the respective position without offsetting each other.

For the non-rotatable coupling of the two swivel arms, a line shaft is expediently provided which bridges the distance between the swivel arms and is parallel to the swivel axis, coupling the swivel arms to one another. According to Wikipedia, a line shaft is a drive shaft of a machine that transmits rotary motion from a drive motor to another part of the machine and/or absorbs the load at the other part.

In an expedient embodiment, the line shaft is a tube anchored on both swivel arms, such as on the inner flanks of the swivel arms facing one another; due to the tube cross-section, the anchored tube offers a sufficiently high section modulus to transfer the load of the faulty side in the event of a one-sided fault.

Due to the non-rotatable coupling of the two swivel arms, it is expedient that the two electric swivel motors, which may be asynchronous motors, can be operated in a master/slave mode for swivelling the swivel arms about the swivel axis. In other words, the master electric motor specifies the movement sequence, which is synchronously controlled on the slave electric motor.

In an expedient embodiment, when the swivel arms are in a position close to the ground, the tube is positioned eccentrically upwards and/or offset in the direction away from the free end of the swivel arms with respect to the swivel axis. Despite a large-diameter tube with a high section modulus, the offset creates a free space which the personnel can use around a workpiece pallet which is docked or in the process of being docked.

In a structurally simple embodiment, the device comprises per swivel arm at least one bearing block cheek having a mounting bracket and floor supports, with the swivel arm there being rotatably mounted and the planetary gear of the combined swivel bevel planetary gear being mounted. The relatively high loads when manipulating with one or two pallets are transferred via the bearing block cheeks, e.g. removed to the ground.

The planetary gear of the combined turning beveled planetary gear is expediently mounted on an outer flank of the swivel arm so that there is adequate free space between the swivel arms and the pallet carriers for docking and undocking of the respective pallet.

In this respect, it is expedient if the respective swivelling electric motor is installed approximately vertically and the respective turning electric motor is installed approximately parallel to the extension of the swivel arm.

Especially because of the use of electric motors and the non-rotatable coupling of the swivel arms, a complex and error-prone sensor system or measuring device for monitoring the movements can be omitted by ensuring that the swivel arms and the pallet carriers or pallets can be mechanically brought to a fixed stop around the swivel axis or around the turning axis respectively; and each can be stopped in the respective end position by tapping the motor power. The motor power can be tapped via a rise in voltage or a rise in current and provides precise information on when the respective fixed stop has been reached.

The device is expediently a pre-assembled structural unit that can be detachably fixed to the horizontal machining center with the mounting brackets, i.e. a so-called pallet change automation.

The horizontal machining center equipped with the device is characterized by increased operational reliability and simpler control, since a critical operating situation is avoided despite a one-sided malfunction with a swivel arm.

BRIEF DESCRIPTION OF THE FIGURES

An embodiment of the subject disclosure is explained with reference to the drawing. The following is shown.

DETAILED DESCRIPTION

Figure 1:
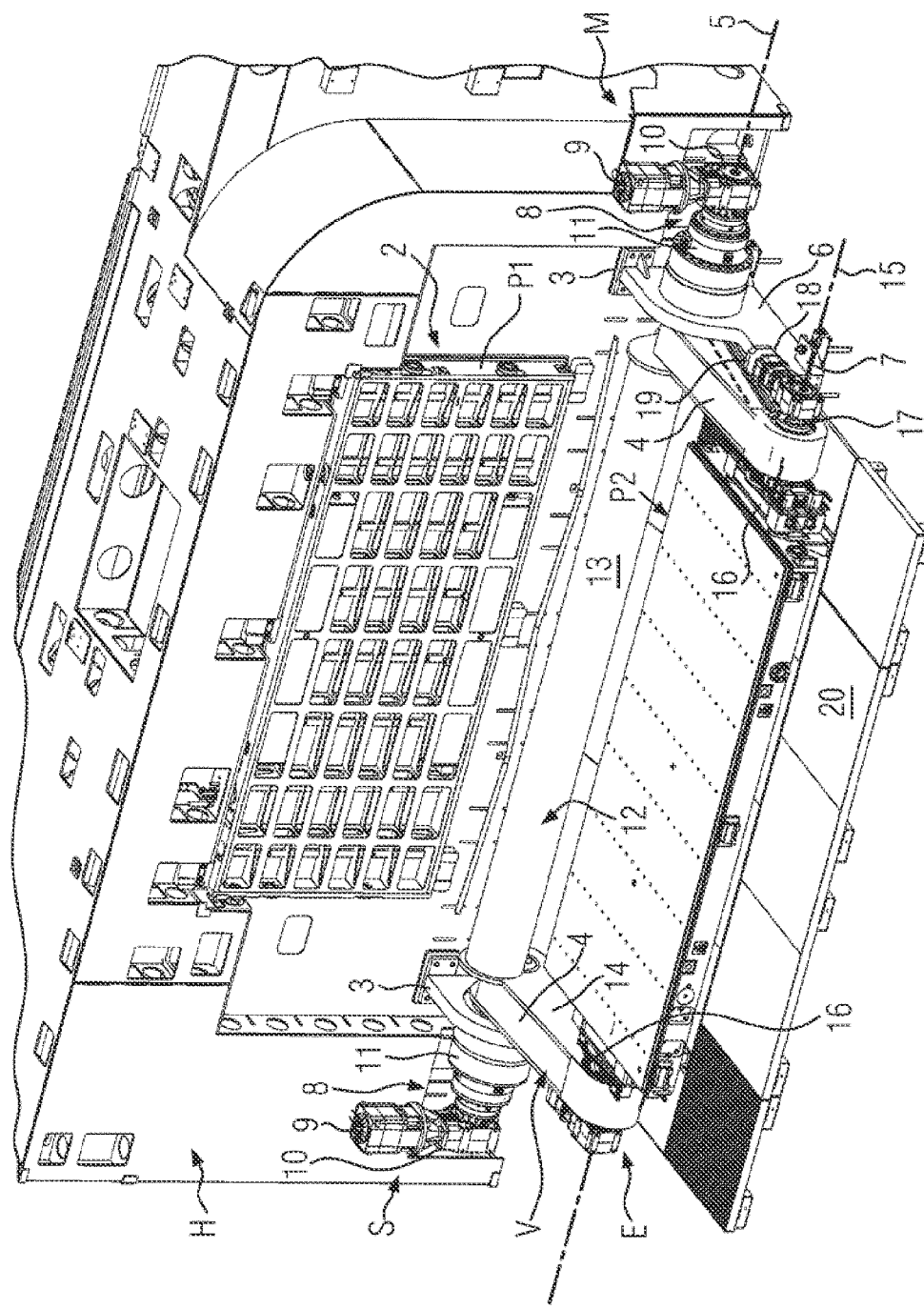
FIG. 1 shows a perspective view of a horizontal machining center with an attached device for swivelling, turning and changing workpiece pallets.
Figure 2:
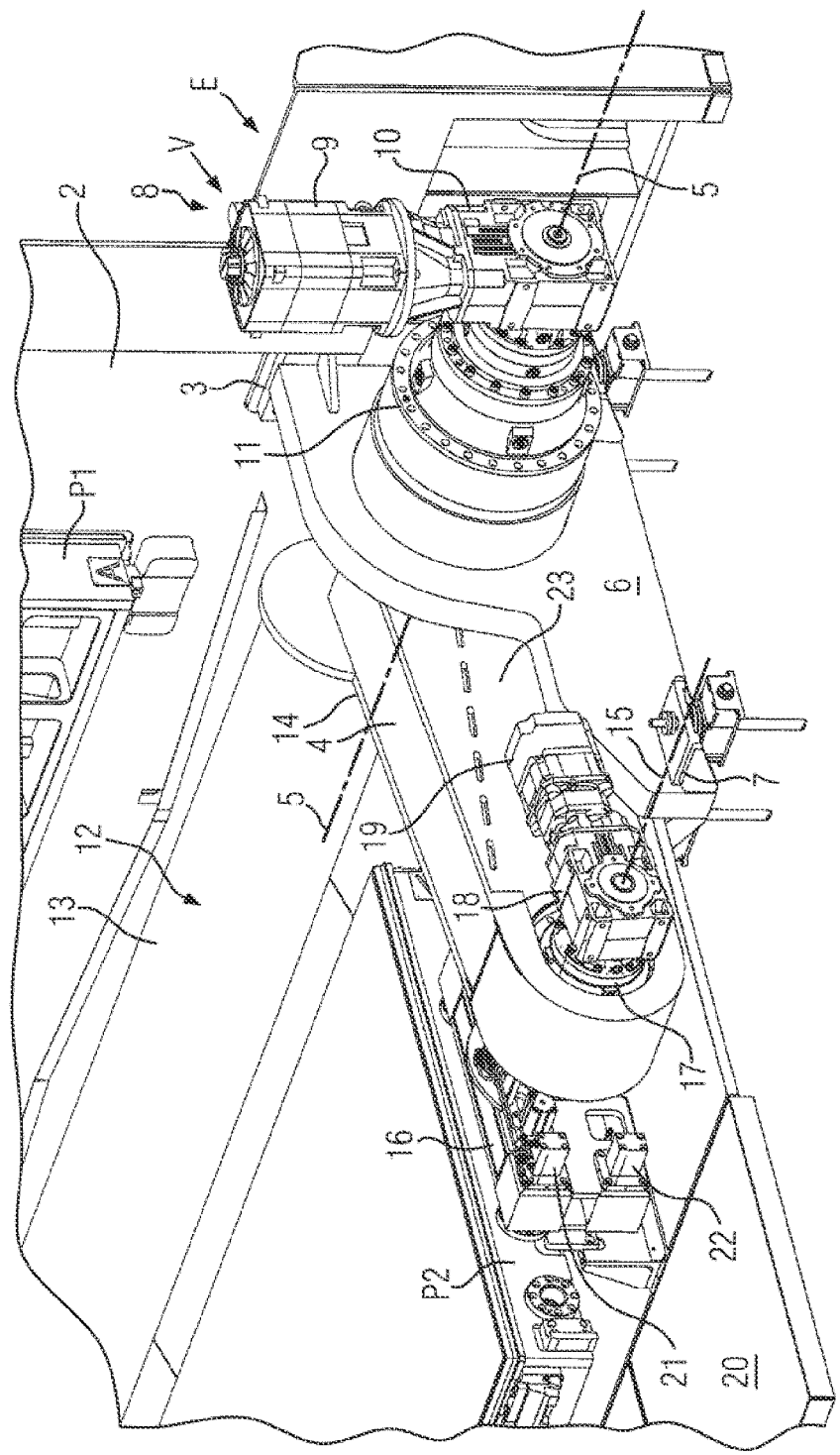
FIG. 2 shows an enlarged detail from FIG. 1.

FIGS. 1 and 2 show a device V for swivelling, turning and changing workpiece pallets P1, P2, as a prefabricated unit E (pallet change automation) mounted or attached to a horizontal machining center H; for example, for machining workpieces W for the aircraft industry.

FIG. 1 shows an overall view of the horizontal machining center H, in whose machining front 2 a pallet P1 is already clamped in a vertical position for machining. Before the horizontal machining center H, a floor-side pallet tray 20 is provided on which a second pallet P2 rests in a horizontal position; and on its upward-pointing set-up side, a workpiece W or several workpieces are positioned; it or them are fixed e.g. by vacuum on the set-up side of pallet P2. Depending on whether the second pallet P2 is taken from the machining position and placed ready for transporting off or made to change into the machining position in exchange for the first pallet P1, the second pallet P2 carries a machined workpiece W or a blank.

The device V has two bracket cheeks 6 which, for example, are mounted with mounting brackets 3 on the front 2 of the horizontal machining center H. Each bearing block cheek 6 can have at least one floor support 7. A swivel arm 4 that protrudes on one side is rotatably mounted in each bearing block cheek 6, which is adjustable by means of a drive unit 8 about a swivel axis 5 that is essentially parallel to the ground between the lowered position near the ground and shown in FIGS. 1 and 2 and an essentially vertical position to the front 2 of the horizontal machining center H swiveled up position. The drive 8 comprises a vertically installed electric motor 9 and a combined bevel and planetary gear with a bevel gear 10 and a planetary gear 11 flanged to the outside of the bearing block cheek 6. The device V can also only be anchored to the ground in front of the center H.

The two swivel arms 4, which can be swivelled synchronously and parallel to each other and at a distance from each other, are coupled in a rotationally fixed manner via a line shaft 12 bridging the distance between the swivel arms 4. In the embodiment shown, the line shaft 12 is a tube 13, the two ends of which are anchored to flanks 14 of the swivel arms 4 that face each other. Optionally, the tube 13 or the line shaft 12 is positioned eccentrically offset in relation to the swivel axis 5 in such a way that the tube 13 is offset in the shown ground-level positions of the swivel arms 4 upwards in relation to the swivel axis 5 and/or in the direction of the front 2 of the horizontal machining center H. This displacement creates free space around the second pallet P2, which can be used, for example, by personnel when working on the second pallet P2.

At the free ends of the swivel arm, a block-shaped pallet carrier 16 each is rotatable about a turning axis 15 parallel to the swivel axis 5, which is turnable, for example over 180°, via an electric motor 19, a bevel gear 18 and a planetary gear 17 flanged to the swivel arm 4. The second pallet P2 is already docked on both pallet carriers 16, for example via props, not shown, of the pallet carriers 16, which are retractable in receiving holes on the pallet front ends by pneumatic or hydraulic cylinder drives 21, 22 (FIG. 2). The electric motor 19 and the bevel gear 18 are installed approximately parallel to the direction of the swivel arm 4 extending on its outer flank 23. The drives 21, 22 for the props can be actuated in pairs independently of each other. The second pallet P2 is docked via the drives 21 located on the top in FIG. 2, while the lower drives 22 are not activated in this operating phase, but are used only later for changing pallets or for docking the first pallet P1. A single pallet P2, as shown, can thus be docked with the pallet carriers 16, or (not shown) both pallets P1, P2 which are then docked back-to-back in the pallet carriers 16. In order to fix the respective workpiece on the pallet P1, P2, the set-up side of the second pallet P2 shown in FIGS. 1 and 2 is provided, for example, with suction openings distributed over a large area, by means of which the workpiece is subjected to a vacuum and fixed (not shown). Pallet P2 is supplied with a vacuum and other working media, such as compressed air or hydraulics or electrical signals, provided via the swivel arms 4 to the pallet carriers 16 and with respect to the vacuum from these e.g. in pallet P2.

The electric motors 9 of the drives 8 and the combined bevel and planetary gears are designed to be so strong that if there is a fault in the drive 8 on one side, the other drive 8 can apply the additional load and is solely responsible for the specific swivelling, so that the swivel arms 4 move in sync despite the disturbance or are kept in sync and in parallel. This is an important safety aspect since such a disruption could lead to extremely critical operating situations without the non-rotatable coupling of the swivel arms 4.

Due to the non-rotatable coupling of the swivel arms 4, it is expedient to carry out the control of the swivelling movements in a mode in which one electric motor 9 acts as the master, while the other electric motor 9 on the opposite side acts as a slave on the other hand. The electric slave motor 9 is electronically controlled according to the movement of the electric master motor 9 so that when the operation is not disrupted, the two electric motors 9 swivel the swivel arms 4 with one or two pallets P1, P2 synchronously and in parallel at all times.

The line shaft 12 could also be designed as a solid profile section. In the case of the tube shown as a line shaft 12 in FIGS. 1 and 2, end plates of the tube 13 are screwed or welded to the mutually facing flanks 14 of the swivel arms 4, for example.

A pallet change, for example, proceeds as follows:

The workpiece on the first pallet P1 is currently being processed. The second pallet P2 is loaded with a blank and is already docked to the pallet carriers 16. After the end of machining or during the machining of the workpiece on pallet P1, which is clamped firmly in the horizontal machining center H and is supplied with energy (vacuum, pneumatic, hydraulic and electrical signals) from the horizontal machining center H, the second pallet P2 is swivelled upwards from the horizontal position shown by means of the swivel arms 4 about the swivel axis 5 by about 45°, for example, and then turned counter-clockwise about the turning axis 15 so that, finally, in the vertical position of the swivel arms 4, its back is moved against the back of the first pallet P1 The lower drives 22 in FIG. 2 dock the first pallet P1 to the pallet carriers 16 before the first pallet P1 is released in the horizontal machining center H. Energy supplies in pallet carriers 16 are here also connected to the first pallet P1. As a result, both pallets P1, P2 are moved away and turned by lowering the swivel arms 4 by about 45° for example, before the front 2 of the horizontal machining center H, so that the set-up side of the second pallet P2 now faces the horizontal machining center H before the swivel arms 4 are swivelled back up and bringing the second pallet P2 into the processing position in which the second pallet P2 is now clamped firmly in the horizontal machining center and the pallet carriers 16 are released from the second pallet P2 via the drives 21. By lowering the swivel arms 4 and turning the first pallet P1, it is finally placed on the floor support 20 with the set-up side pointing upwards. In other words, the device V enables the handling of optionally only one pallet P1 or P2 or the simultaneous handling of two pallets P1, P2.

By using the electric motors 9, 19 for swivelling and turning, a complex sensor system or measuring device for monitoring the movements and positions of pallets P1, P2, of the swivel arms 4, and of the pallet carriers 16 can be omitted, and each can be moved mechanically to a fixed stop, while the performance of the electric motors 9, 19 is monitored to the effect that when a fixed stop is reached, the increasing motor current or the changing voltage is tapped and the movement is stopped and the position reached is held.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A device for swiveling, turning, and changing workpiece pallets, the device comprising:
    two parallel, spaced swivel arms that are each fitted with a respective pallet carrier,
    wherein each of the swivel arms can be swivelled via a respective swivel motor and a respective swivel gearing about a substantially horizontal, ground-parallel swivel axis,
    wherein each of the pallet carriers can be rotated relative to the corresponding swivel arm via a respective turning motor and a respective turning gearing about a turning axis that is parallel to the swivel axis,
    wherein each of the motors is a respective electric motor,
    wherein each of the gearings is a respective combined bevel planetary gearing, and
    wherein the swivel arms are coupled to each other, so as to be non-rotatable relative to one another, via a line shaft that bridges a distance between the swivel arms,
    wherein a longitudinal center axis of the line shaft is parallel to the swivel axis.

2. The device according to claim 1, wherein the line shaft is a tube anchored on both of the swivel arms.

3. The device according to claim 2, wherein the tube is positioned eccentrically upwards from the swivel axis and/or is positioned offset from the swivel axis in a direction away from free ends of the swivel arms when the swivel arms are in a position such that one of the pallets resting thereon has a set-up surface that is horizontal.

4. The device according to claim 2, wherein the line shaft is anchored on mutually facing inner flanks of the swivel arms.

5. The device according to claim 1, wherein the two electric swivel motors can be operated in a master/slave mode to swivel the swivel arms about the swivel axis.

6. The device according to claim 5, wherein the two electric swivel motors are asynchronous motors.

7. The device according to claim 1, wherein each of the swivel arms is provided to a respective bearing block cheek,
    wherein each of the bearing block cheeks has a corresponding at least one mounting bracket, and
    wherein each of the bearing block cheeks has at least one floor support,
    wherein the swivel arms are rotatably mounted so as to rotate at a location that is between the bearing block cheeks, and
    wherein a respective planetary gearing of each of the combined bevel planetary gearing of the swivel gearings is mounted outside a space between the bearing block cheeks.

8. The device according to claim 7, wherein a respective planetary gearing of each of the turning gearings is mounted on a respective outer flank of the corresponding one of the swivel arms.

9. The device according to claim 7, wherein each of the swivel electric motors is installed on a respective one of the bearing block cheeks so as to extend approximately vertically, and each of the turning electric motors is installed on a respective one of the swivel arms so as to extend approximately parallel to a direction of extension of the corresponding swivel arm.

10. The device according to claim 7, wherein the device is a pre-assembled structural unit that can be removed with each of the at least one mounting bracket, and/or the pre-assembled structural unit can be fixed on the floor in front of a machining center.

11. The device according to claim 1, wherein the swivel arms about the swivel axis and the pallet carriers about the turning axis can each be moved mechanically to a fixed stop.

12. The device according to claim 1, wherein the device is configured to provide the workpiece pallets to a machining center and/or to remove the workpiece pallets from the machining center.

13. A machining center for machining workpieces fixed on swivelling, turnable and changeable workpiece pallets, wherein the machining center is equipped with the device according to claim 1.

* * * * *